US012618200B2

(12) United States Patent
Hürlimann

(10) Patent No.: US 12,618,200 B2
(45) Date of Patent: May 5, 2026

(54) APPARATUS AND METHOD FOR APPLYING SINGLE-COMPONENT OR MULTI-COMPONENT ADHESIVE TO A BALLAST BED AND USE

(71) Applicant: HÜRLIMANN RAILTEC AG, Illnau (CH)

(72) Inventor: Adrian Hürlimann, Illnau (CH)

(73) Assignee: Hürlimann Railtec AG, Illnau (CH)

( * ) Notice: Subject to any disclaimer, the term of this patent is extended or adjusted under 35 U.S.C. 154(b) by 0 days.

(21) Appl. No.: 18/266,911

(22) PCT Filed: Dec. 14, 2021

(86) PCT No.: PCT/EP2021/085621
§ 371 (c)(1),
(2) Date: Jun. 13, 2023

(87) PCT Pub. No.: WO2022/129001
PCT Pub. Date: Jun. 23, 2022

(65) Prior Publication Data

US 2024/0044087 A1 Feb. 8, 2024

(30) Foreign Application Priority Data

Dec. 14, 2020 (CH) .................................... 01585/20

(51) Int. Cl.
*E01B 37/00* (2006.01)
*B05B 13/00* (2006.01)
(Continued)

(52) U.S. Cl.
CPC ............ *E01B 37/00* (2013.01); *B05B 13/005* (2013.01); *B05B 13/0421* (2013.01); *E01B 1/001* (2013.01)

(58) Field of Classification Search
USPC ....... 118/313, 315, 321, 323, 663, 695, 696, 118/698
See application file for complete search history.

(56) References Cited

U.S. PATENT DOCUMENTS

2015/0284912 A1* 10/2015 Delmonico ............. B05B 13/06 104/17.1
2019/0118207 A1 4/2019 Hüerlimann

FOREIGN PATENT DOCUMENTS

CA 3021427 C 1/2018
CN 109258606 A * 1/2019 ........... A01C 23/047
(Continued)

OTHER PUBLICATIONS

WIPO-Provided, English-language translation of the International Preliminary Report on Patentability (Form PCT/IPEA/409), Jun. 14, 2023, 12 pages. (Year: 2023).*
(Continued)

*Primary Examiner* — Yewebdar T Tadesse
(74) *Attorney, Agent, or Firm* — Edwin D. Schindler

(57) ABSTRACT

An apparatus for applying a single-component or multi-component adhesive to a ballast bed of a stretch of rails in a rail path, includes a container for the adhesive and elements for conveying the adhesive for application are mounted on a supply vehicle which can be driven on, or adjacent to, the rail path. The adhesive is guided from the supply vehicle with a hose having a one nozzle. The apparatus further includes a trolley that can be temporarily coupled and secured to a rail, and can be moved in a rail-bound manner at a desired and uniform speed independently of the supply vehicle. The trolley supports a boom on which the nozzle is mounted, so that a defined depth of penetration of the adhesive can be maintained by the apparatus at a uniform running speed of the trolley and defined
(Continued)

Figure 1:
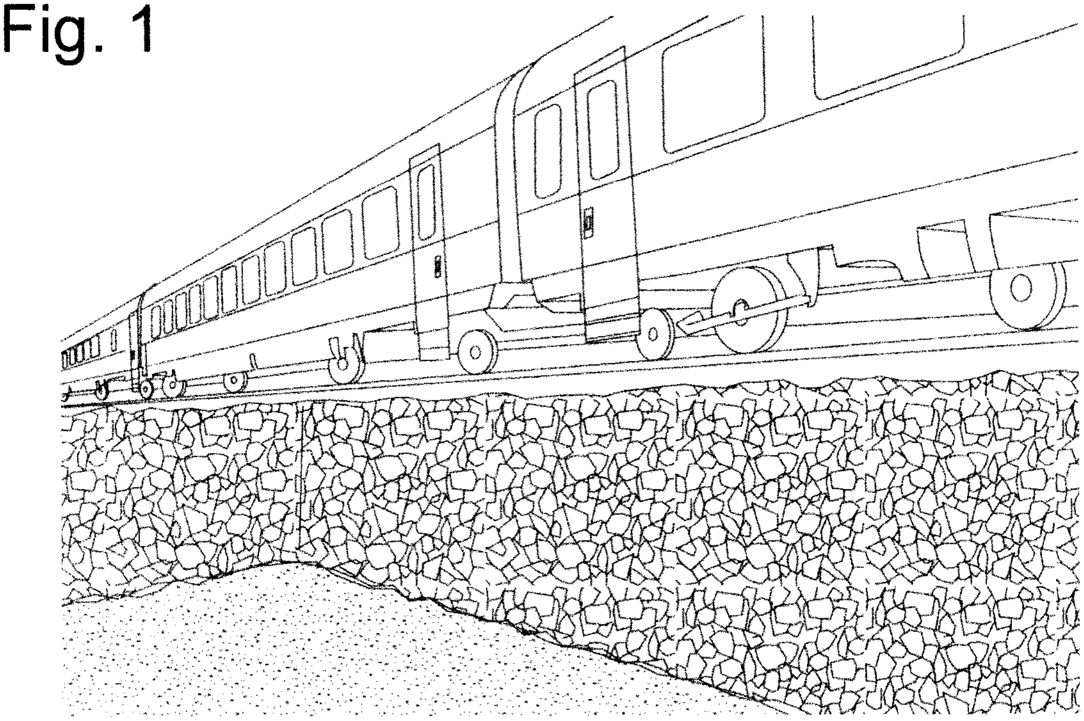

flow rates of the adhesive depending upon the characteristics of the ballast bed and spray pattern.

16 Claims, 10 Drawing Sheets

(51) Int. Cl.
*B05B 13/04* (2006.01)
*E01B 1/00* (2006.01)

(56) References Cited

FOREIGN PATENT DOCUMENTS

| | | | | | |
|---|---|---|---|---|---|
| DE | 19704463 | A1 * | 8/1998 | ............. | B61D 15/06 |
| WO | WO-2018010860 | A1 * | 1/2018 | ........... | B05B 12/126 |

OTHER PUBLICATIONS

CN-109258606-A (Year: 2019).*
DE-19704463-A1 (Year: 1998).*

* cited by examiner

APPARATUS AND METHOD FOR APPLYING SINGLE-COMPONENT OR MULTI-COMPONENT ADHESIVE TO A BALLAST BED AND USE

BACKGROUND OF THE INVENTION

Technical Field of the Invention

The invention relates to a device for discharging single-component or multi-component adhesive onto a granular mixture, in particular for discharging single-component or multi-component adhesive onto the ballast of a rail track. In the case of two-component adhesives, for example, the two fluid components are conveyed in a controlled manner from storage tanks via two separate feed lines by means of gear pumps in precisely controllable flow rates via a mixing unit, thus producing a fluid sprayable adhesive mixture. A spray unit with at least one spray nozzle or with a spray bar with several discharge nozzles is used for the targeted discharge of the adhesive mixture onto the ballast bed. However, single-component adhesives can just as well be used and conveyed with such a device, with exactly the same structural features of the device. The invention further relates to a method of using this device and its use for discharging adhesives, both two-component and single-component, onto the ballast of a rail track.

Description of the Prior Art

Today, rail tracks are an important component of both mainline and mass transit infrastructure. Not in every case can the rail superstructure cope with the increasing traffic load. With increasing speed, greater traffic loads or higher intensity of use, weaknesses of the different types of construction become apparent. In addition to regular maintenance, track renewal is a necessary measure to cope with the increased load. In mainline traffic, ballasted track is the dominant base layer. In urban traffic, on bridges or in tunnels, on the other hand, a solid track is used. Adhesive systems offer an efficient solution for both types of track and for joining different tracks. In ballasted track systems, the loosely laid track grid of rails and sleepers lies in this unbound, compacted ballast bed without any lateral fastening. The ballast bed can absorb considerable compressive forces, but can only be displaced within limits under tensile load. In difficult areas such as rail joints or switches, adhesive systems ensure positional stability quickly and permanently. In the case of reconstruction work and track renewal on multi-track lines, special measures are required to secure the position of the ballast bed. Bonding the ballast shoulders with single-component adhesives or, even better, with two-component resin-hardener mixtures has proven to be an effective method for this purpose. Compared with conventional shoring measures, the use of a fast-curing adhesive system saves time and costs to a large extent. A particularly difficult area for rail tracks is the integration of different types of construction. Transitions between a ballasted track and a slab track are problematic because of the different settlement behavior. Here, graded bonding of the ballast has proven to be an effective measure for equalizing different elasticities. Adhesive systems also offer particular advantages for this purpose, namely, short waiting times until load-bearing capacity is reached and very good environmental compatibility of the adhesive system. In inner-city mass transit, it is mainly slab tracks and grass tracks that determine the appearance of rail tracks. For these designs, too, the two-component compounds offer efficient detailed solutions for stabilizing, sealing and designing the track systems.

Today, the bonding of granular mixtures is used in a wide variety of applications. In track construction, mainly coarse-grained stone fills and gravel are bonded, while in road construction, in addition to coarse-grained stone fills, smaller-grained stone fills or chippings are also bonded. Even finer mixtures are used, for example, in the bonding of decorative top floor coverings. Despite stabilization by bonding the covering, its water permeability or seepage capacity can be maintained. The bonding of ballast is of particular importance in track construction. For this purpose, two-component adhesives based on polyurethane are mostly used today. Such polyurethane-based multicomponent adhesives are known in the state of the art. Two-component mixtures can be adapted to the respective situation by varying the mixing ratio of resin and hardener in the curing time and achieve a better bonding quality than one-component adhesives, with which a certain compromise is made. Single-component adhesives are easier to handle, however, because no mixer is required and only a single pump and line are needed for delivery. Devices for the controlled pumping, metering, mixing and dispensing of such adhesives, be they one- or two-component adhesives, using gear pumps, among other things, are also known in principle.

Various positive effects are achieved by bonding ballast in track construction. Among other things, it enables stabilization of the tracks and reduction of impacts at transitions from the ballasted track to the ballastless track, for example at tunnel entrances or exits. For this purpose, the ballast is usually bonded over the entire surface, i.e. also under the rails and sleepers. In order to reduce the impacts at the transitions between ballast and ballastless track, the penetration depth of the bonding is successively increased towards the ballastless track. In addition to improving ride comfort, the bonding of the ballast also improves the durability of the guideways by preventing the stones from shifting.

Bonding of the ballast bed at the edge of a rail line is often of crucial importance when a trench is to be excavated close to the rail line or, more generally, when material is to be excavated next to the rail line as a result of a construction project, such as the laying of another parallel rail line or a building, a retaining wall, etc., or because of other structural measures. For the construction of a new rail track along an already existing rail track, a channel several meters wide and, for example, 0.5 to 2 meters deep is excavated from the subsoil, on the bottom of which vehicles such as trucks, dumpers, excavators and other machines are then driven, which are used in the course of the construction of the new rail track. Because this so-called construction slope will run close to the existing rail line, the ballast bed of the adjacent rail line is at risk of weakening and its load-bearing capacity is threatened. In order for the rail line to remain in operation and for trains to be able to run on it, the stability of its ballast bed is of enormous importance, otherwise trains with their considerable weights would no longer be able to pass this point. As a countermeasure, a deep splinting or an auxiliary wall could temporarily ensure the stability so that the track could continue to be used. However, it is much easier to bond the ballast along the side where such structural changes are to be made, which would otherwise significantly weaken the ballast track. Thus, by gluing the ballast bed only on a strip at the side of the roadway, a stable ballast shoulder can be created very quickly. This shoulder proves to be advantageous when laying and maintaining control and signal lines along the tracks, since a trench can be dug outside the bonded area without further ado and, thanks to the defined stable shoulder of the ballast bed, the laid control and signal lines can be easily exposed and, after replacement of the lines, the trench can be backfilled without affecting the basic shape of the ballast bed. The ballast bed shoulder, stabilized by bonding, remains passable with the usual loads despite the trench excavated directly next to the rail line. In the case of a professionally bonded ballast bed, this can be tapped off to the side, so to speak, and excavation can be carried out directly next to the ballast bed, for example. Thanks to the bonding, the necessary stability of the ballast track is maintained for the usual running of trains, which offers enormous advantages. Of course, the same equipment can also be used to reinforce the rail track over its entire width by means of ballast bonding.

However, the application of the adhesives to produce such a stable bond requires that the penetration depth of the adhesive into the ballast bed reaches a precisely specified depth everywhere and also that the amount of adhesive is applied at a precisely constant rate at a defined spray width per linear meter, whereby in the case of multi-component adhesives these must always be applied in the correct mixing ratio of the compounded adhesive. Furthermore, it must be possible to carry out such bonding quickly and reliably not just over a few meters, but over larger sections. All the necessary boundary conditions must be met with extreme precision, for example, in the case of multi-component adhesives, the temperatures of the adhesive components and an absolutely constant, continuously monitored mixing ratio, and further a uniform discharge of the adhesive over the treatment section with a constant speed of the spray jet over the ballast to maintain a constant penetration depth into the ballast bed. This is the only way to ensure that the ballast is bonded over a defined depth with a precisely defined quantity of adhesive per ballast volume, depending also on the size of the ballast stones and the desired penetration depth. Only if these specifications are strictly adhered to can such bonding be certified in the sense that a railroad train of a certain weight may continue to travel on a rail section to the side of which, as mentioned above, construction measures are being taken, i.e. trenches are being dug for pipeline structures or retaining walls or construction pits of all kinds.

According to the prior art, the discharge of adhesives can be performed in a very professional manner, as comprehensively illustrated in document WO 2018/010860 A1, published on Jan. 18, 2018. The device shown there allows the adhesive materials to be discharged in a dosage with which a very specific amount of adhesive is sprayed onto the ballast bed per linear meter, thus ensuring a certain pre-calculated penetration depth. This is why the process carried out with this equipment is now even certified by the Swiss Federal Railways (SBB), i.e. its application guarantees that the rail bed will subsequently provide a certain desired load-bearing capacity and can therefore be used as usual by trains weighing several hundred tons. This is not the case if, as was the case before, the track bed is only removed manually by means of watering cans or hand lances, with hand or motor-driven pumps. For such a manual discharge, the two basic components of a two-component adhesive are carried along on a railroad car, for example, and mixed there. The mixture is then filled into pouring cans or fed directly to the hand lances via a pipe. To glue one $m^3$ of ballast, 15 liters of adhesive mixture are needed. When spreading by means of a watering can, only about 4 $m^3$ of ballast can be treated per hour. In addition, the spreading quality is highly uneven, as it depends on the skill of the person who pours with the watering can or operates the hand lance and thus walks along the railroad track. When the adhesive is discharged by hand, there are inevitably interruptions in the discharge in order to refill a can or to advance the supplies, i.e. the containers and the machinery for pumping the adhesive to the lance, in stages, because these containers and equipment are either carried on a railroad wagon or transported by road and placed to the side of the rail section. If for some reason a malfunction occurs, for example, a pump does not run correctly or fails, spraying of a single component, toxic in itself, in larger quantities can happen, with fatal consequences for the groundwater. The components of multi-component adhesives may only be applied in the prescribed mixing ratio, intimately mixed. Then the mixture hardens reliably and no individual component can enter the soil in isolation.

These problems have been successfully overcome with the device and method according to WO 2018/010860 A1. However, the following limitation remains for the device according to WO 2018/010860 A1 and the method operated with it: For the bonding of the ballast bed, a rail vehicle or at least one road vehicle optionally movable on rails must always be running on the rail line whose ballast bed is being bonded. This requires closure of this rail line and all work must therefore be closely coordinated with the control center. The equipment is therefore only suitable for operations where it is worthwhile temporarily closing a section of rail to train traffic.

Bonding must always be carried out quickly and helps to determine the depth of penetration, because the applied adhesive runs down through the ballast and, as it bonds and hardens immediately, the depth of penetration is limited. The work of spreading has so far usually had to be done outside traffic hours and often at night, and in addition dry weather is a prerequisite for spreading the adhesive. It can be seen that there are many boundary conditions, resulting in the requirement that uniform spreading with precisely defined specifications should be carried out reliably by machine and very quickly on site.

If bonding is to be carried out somewhere on a rail section, for example in a station, or in places that are difficult to access, such as bridges, underpasses or overpasses, or generally in places where the rail track cannot be accessed laterally by vehicles, it is a particular challenge to be able to carry out a uniform application there quickly, if possible in an instant, i.e. without any interruptions. If one calculates with about 15 liters of adhesive mixture per $m^3$ of track ballast to be treated, then with half a meter of bed depth to be bonded and half a meter of bed width at the side of the rail, these are sufficient for 4 running meters, and two 200-liter drums are then sufficient for little more than 100 meters of rail section, because one needs 3.75 liters/running meter, and if the bonding is to be done over the full ballast bed width of about 4 meters, only a section of about 13.3 meters can be bonded in one pass. The formula is: factor×depth×width, for example 1.5×5 m×0.5 m=3.75 liters/running meter, or 1.5×5 m×4 m=30 liters/running meter.

A particular challenge for the rapid and controlled dispensing of adhesive—in a perfect mixture of components in the case of a multi-component adhesive—and with a consistent penetration depth over greater distances in an instant is the fact that large masses are required for the necessary machinery and the storage tanks. Powerful pumps are needed, for example. Furthermore, a self-sufficient energy supply is necessary, both for the pumps and, depending on the situation, for tempering the adhesive to be applied or its components, which must be available in large quantities.

And then it should be possible to move all these facilities along a route. It is possible to move these devices along a rail track with a truck, but this truck cannot be moved along the track so uniformly that the right amount of adhesive per linear meter could be reliably applied with a spray bar attached to it. Or a rail car could separately carry the adhesives and the equipment for their tempering, mixing and pumping, but the uniform application of the adhesives directly from a rail car is difficult to realize, because it is without drive and has a large inherent mass.

In the prior art, various devices for the controlled mixing of components to form a defined mixture are known, and the method and device according to WO 2018/010860 A1 convincingly solves many problems and enables the controlled and precise spreading of adhesives for the purpose of bonding ballast beds along rail tracks over many hundreds of meters in an instant, as long as the vehicle can stand and be driven on both tracks for spreading.

SUMMARY OF THE INVENTION

In view of this prior art, it is the task of the present invention to create a device and a method that can be used even more quickly and flexibly, so that ballast bonding along a rail line can be carried out without blocking the rail line concerned, depending on the situation, i.e. so that the time intervals between the passing of trains can be utilized and regular train traffic can continue without disruption.

The foregoing and related objects are accomplished by the apparatus of the present invention for applying a single-component or multi-component adhesive to a ballast bed of a stretch of rails in a rail path, includes a container for the adhesive and elements for conveying the adhesive for application are mounted on a supply vehicle which can be driven on, or adjacent to, the rail path. The adhesive is guided from the supply vehicle with a hose having a one nozzle. The apparatus further includes a trolley that can be temporarily coupled and secured to a rail, and can be moved in a rail-bound manner at a desired and uniform speed independently of the supply vehicle. The trolley supports a boom on which the nozzle is mounted, so that a defined depth of penetration of the adhesive can be maintained by the apparatus at a uniform running speed of the trolley and defined flow rates of the adhesive depending upon the characteristics of the ballast bed and spray pattern. More particularly, the complete device can be transported by road or brought into place on the track. In one embodiment, the vehicle with the entire device for providing and pumping the adhesive or adhesive components for the adhesive mixture in use travels substantially parallel alongside the rail track, independently of train traffic or in such a way that regular train traffic is not impeded. For the regular application of adhesive, a trolley or lightweight rail wagon is placed on the rails within a very short time, approximately within seconds. This trolley or rail wagon carries a boom with at least one spray nozzle. The trolley or this light rail wagon can be electrically driven to travel along the rail at a selectable uniform speed, whereby the boom mounted or formed on the trolley or rail wagon with at least one spray nozzle mounted thereon travels along the rail at exactly the same uniform speed. This ensures that an adjustable quantity of adhesive with a defined spray pattern can be applied per meter of travel, thus maintaining a predefined penetration depth. In practice, the trolley or this lightweight rail wagon can be quickly placed on a rail and put into operation within a few seconds, and removed from the rail just as quickly to allow a train to pass through. The rail wagon is preferably controlled by remote control. The travel speeds traveled as well as the GPS coordinates can also be recorded or transmitted live to a cloud and stored. This makes it possible, in conjunction with a state-of-the-art conveying and mixing system with data recording, to carry out a verifiable and thus calculable and resilient ballast bonding operation. As a variant, this trolley or light rail wagon can also be supplied by a rail car running on a parallel track or on the same track instead of by a truck traveling alongside the rail, which is then pulled or pushed along irregularly one after the other with the spraying equipment by a light locomotive or a trolley. Only the trolley or this light rail wagon then ensures uniform application of the adhesive, precisely depending on the speed of movement of the nozzles, a defined quantity of adhesive is applied, thus ensuring a precisely defined penetration depth. Either a separate light rail wagon or a trolley as spray trolley moves uniformly forward on the rail, or on this rail wagon or spray trolley the spray nozzles can be moved uniformly back and forth, so that ultimately a predefined penetration depth is maintained.

BRIEF DESCRIPTION OF THE DRAWING FIGURES

With reference to the drawings, this device for producing the bonds of a granular mixture is presented and described, and its functions are explained. Then, the method and use of the device that can be carried out with it is described and explained in more detail. For this purpose, the drawings show an embodiment of the device, for example, and the task and the purpose of the invention are also shown and explained with reference to the figures.

Figure 2:
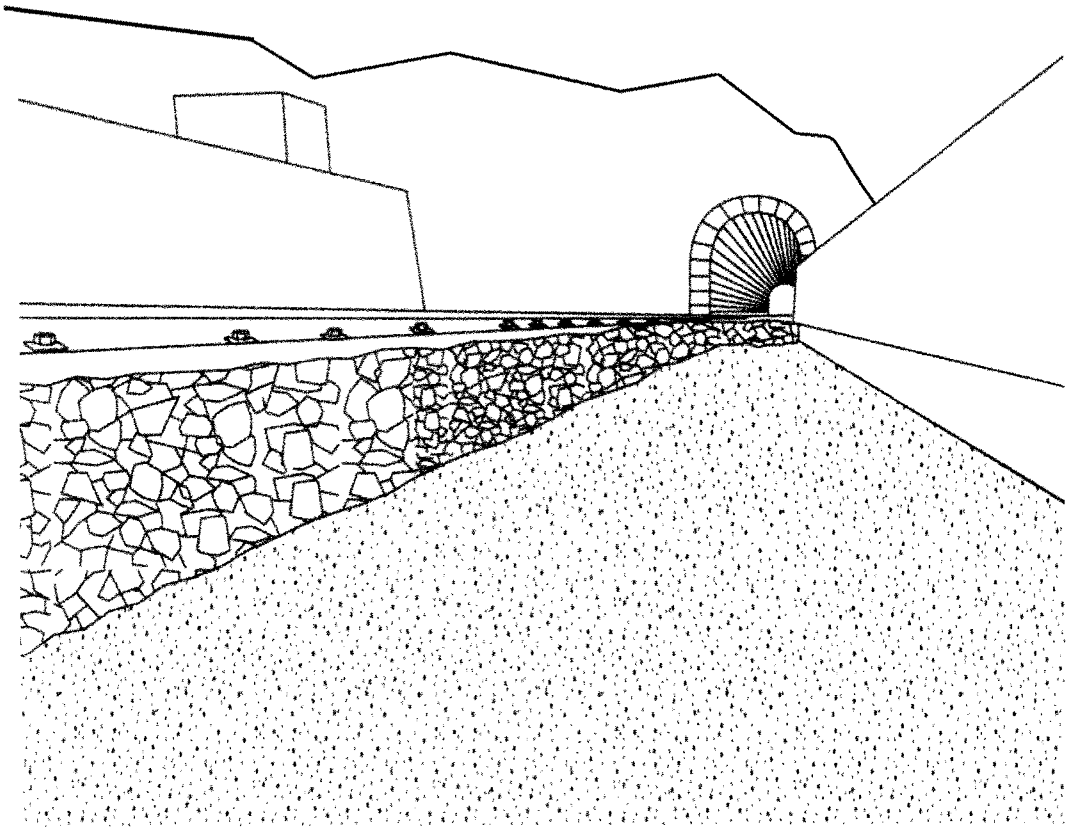
Figure 3:
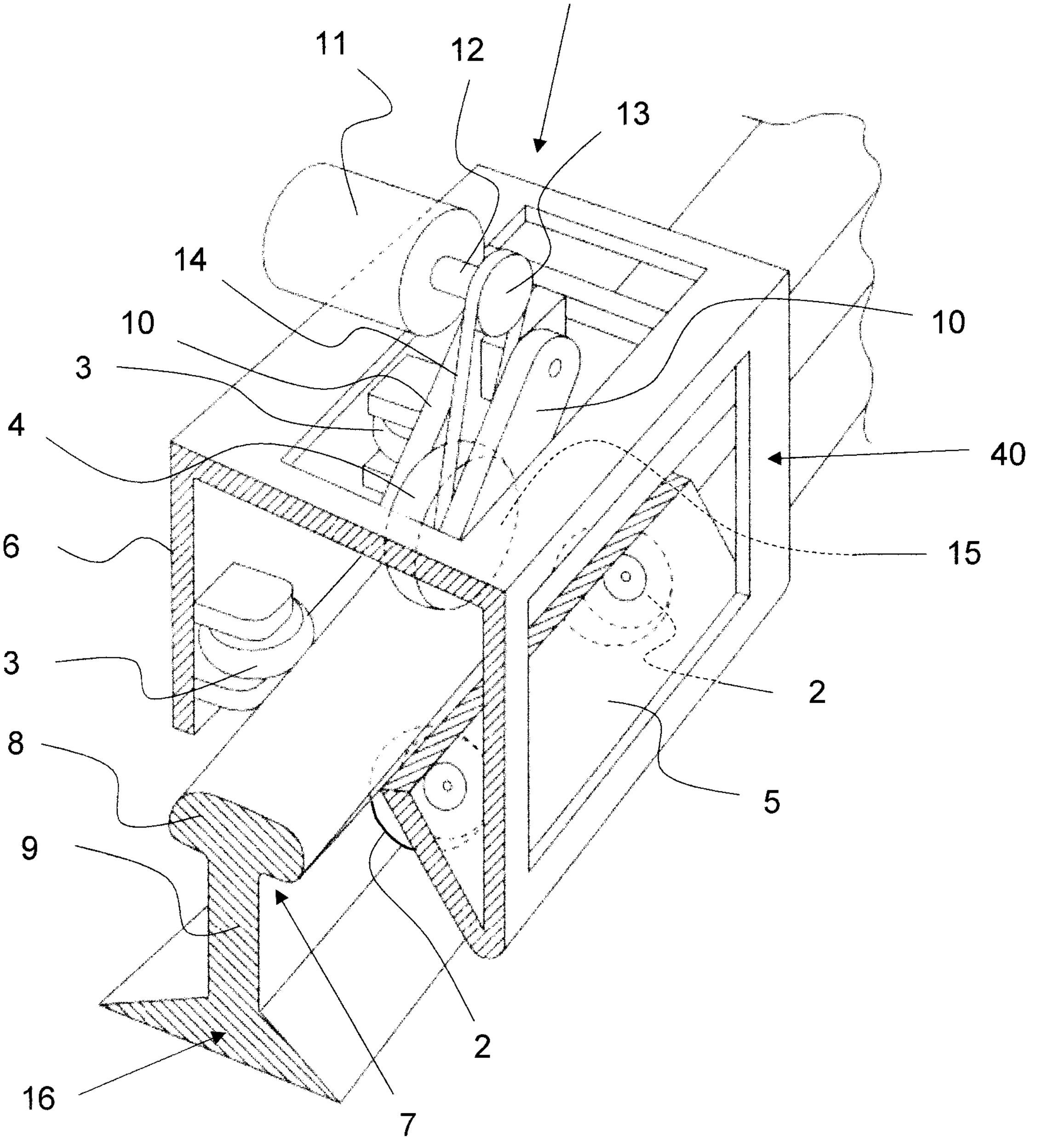
Figure 4:
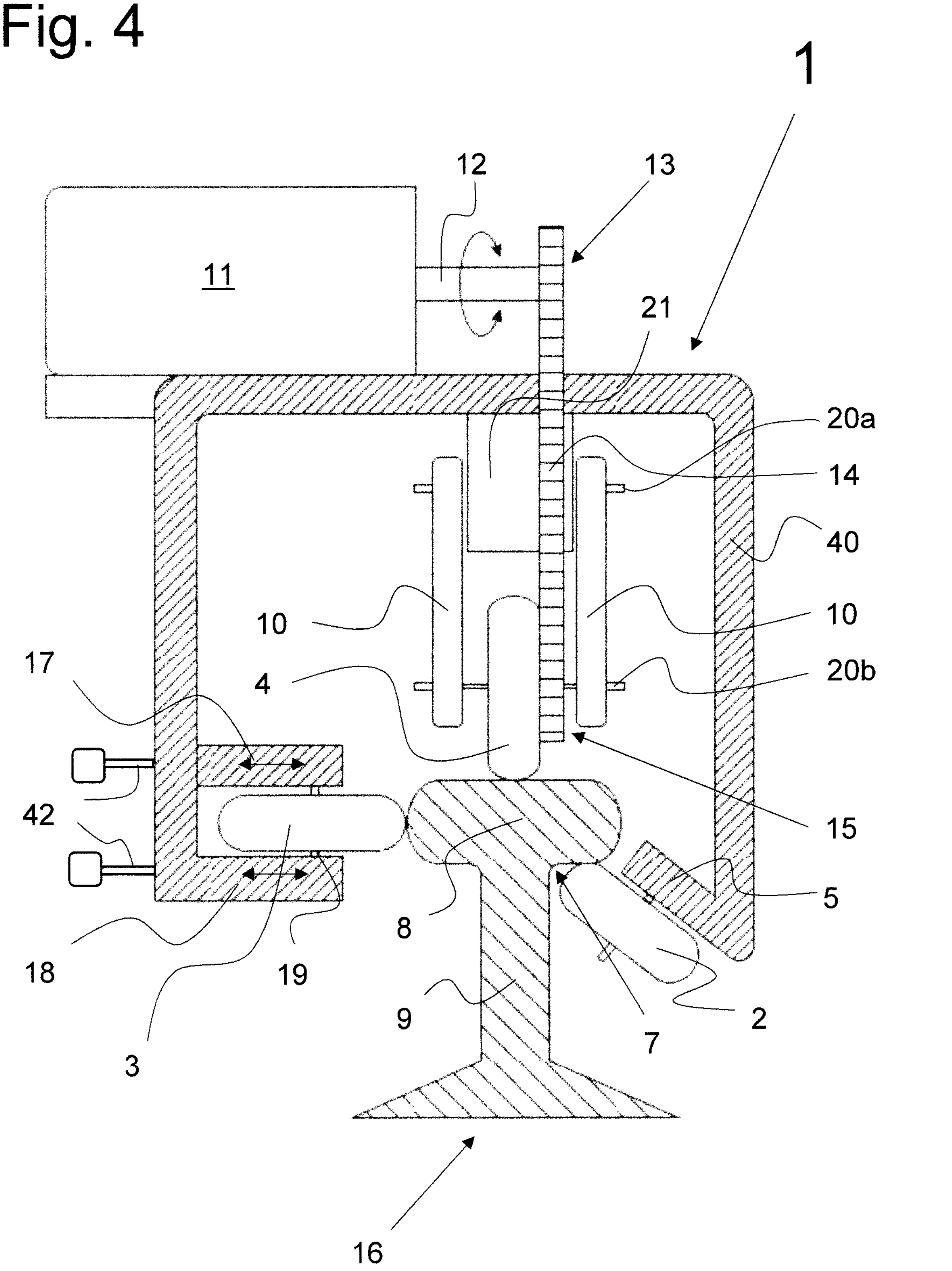
Figure 6:
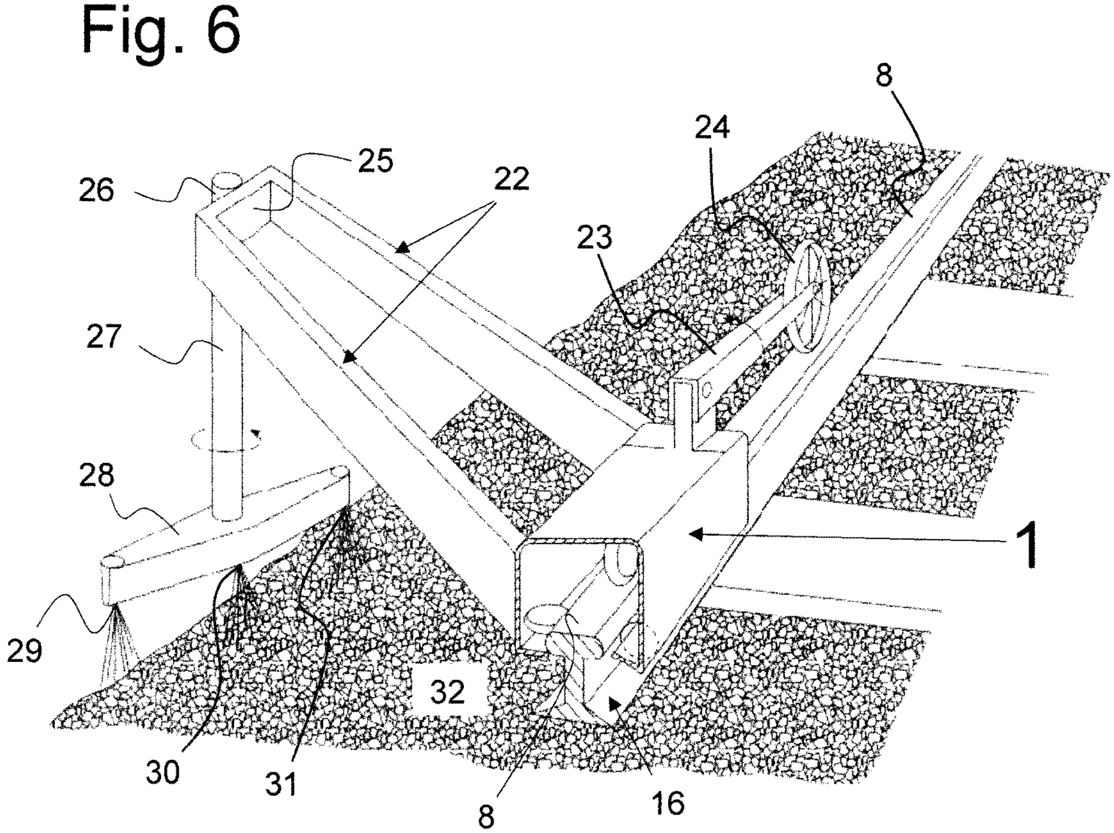
Figure 7:
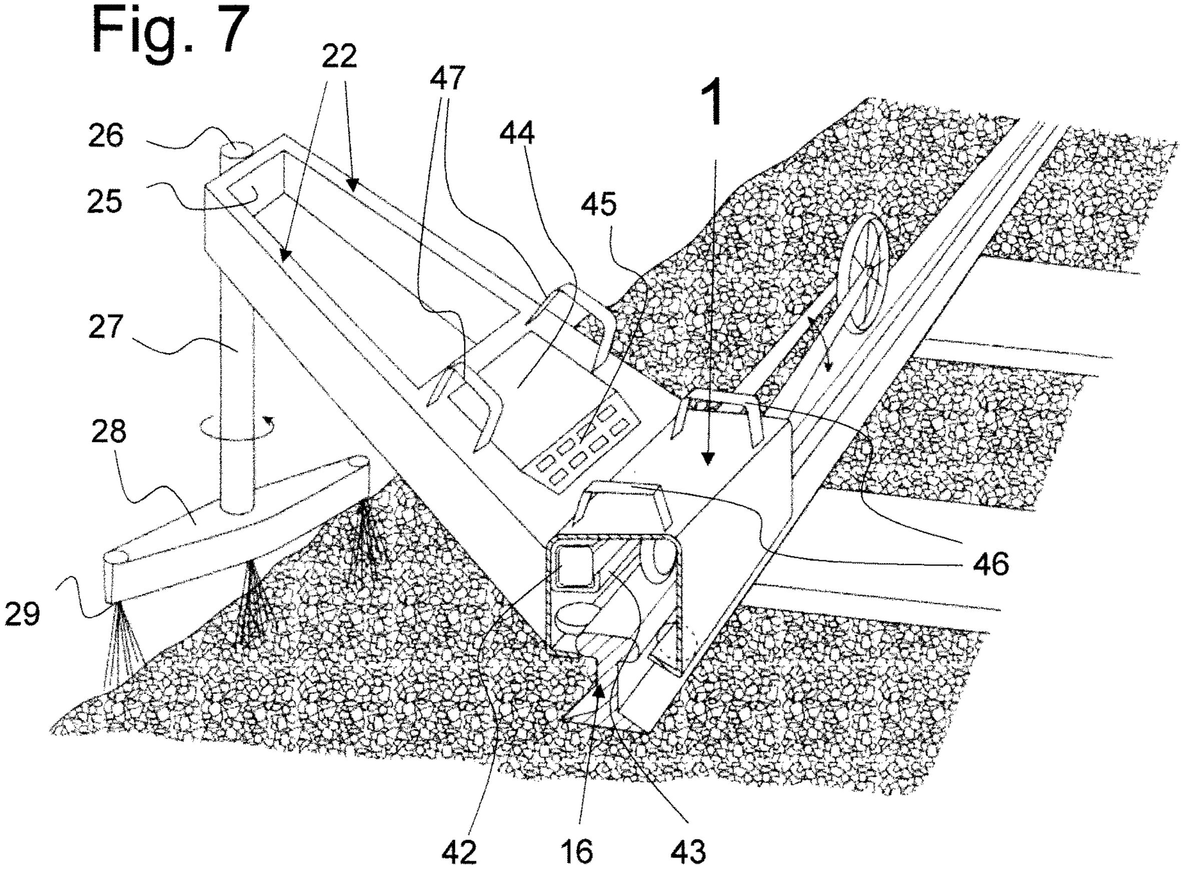
Figure 8:
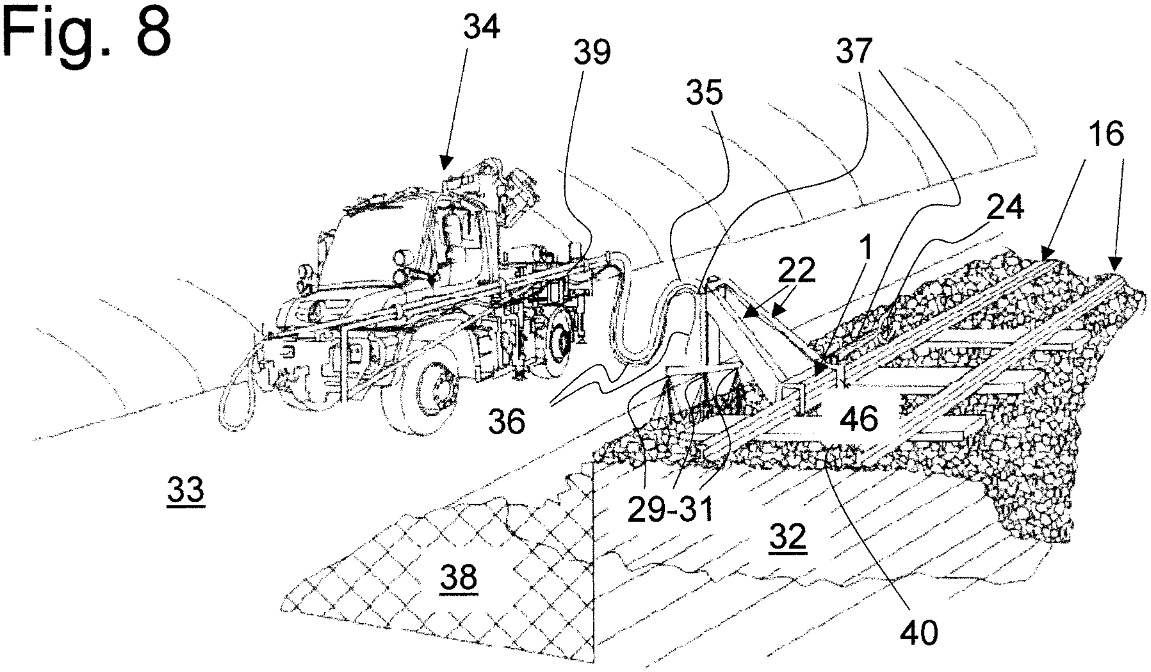
Figure 9:
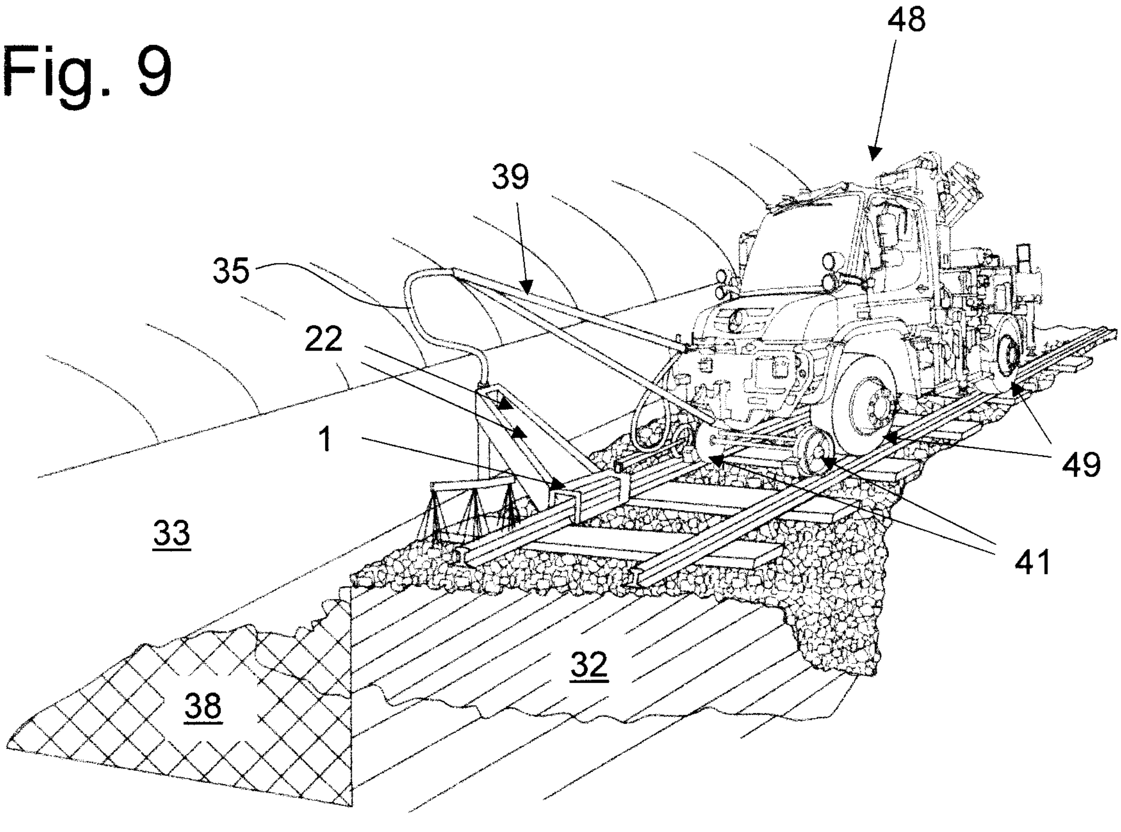
Figure 10:
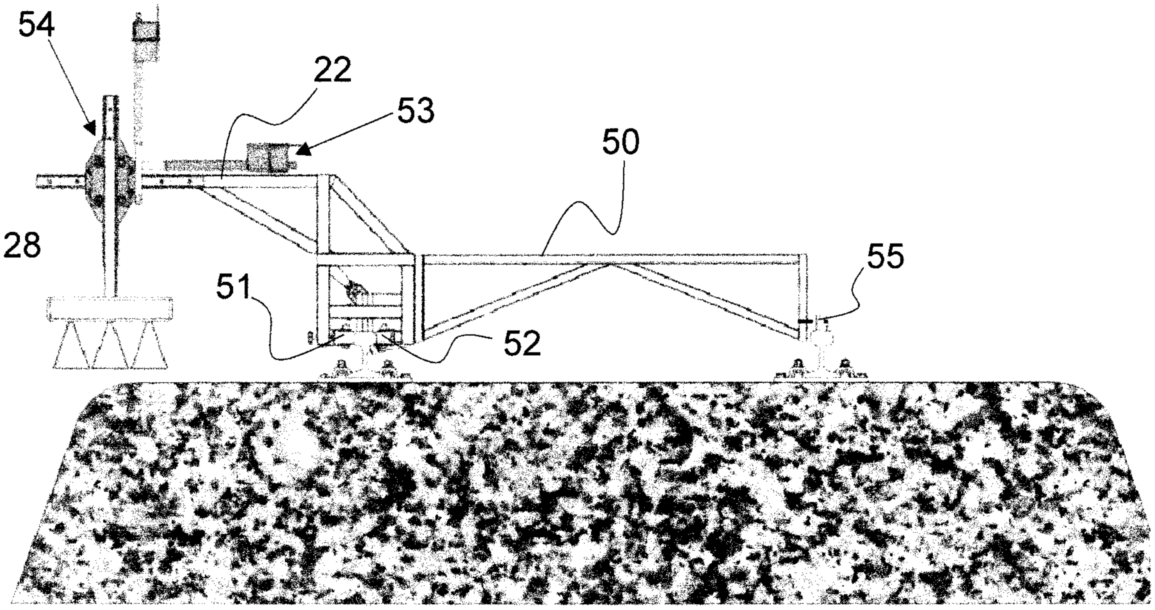
Figure 11:
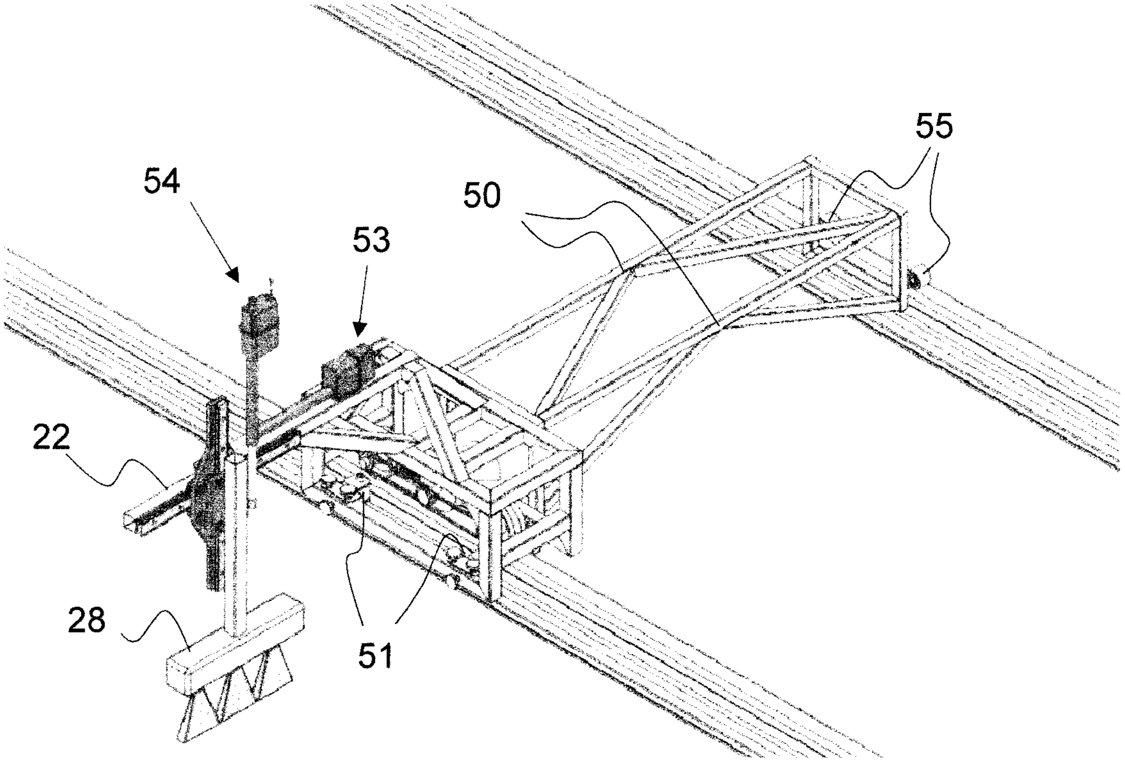
Figure 12:
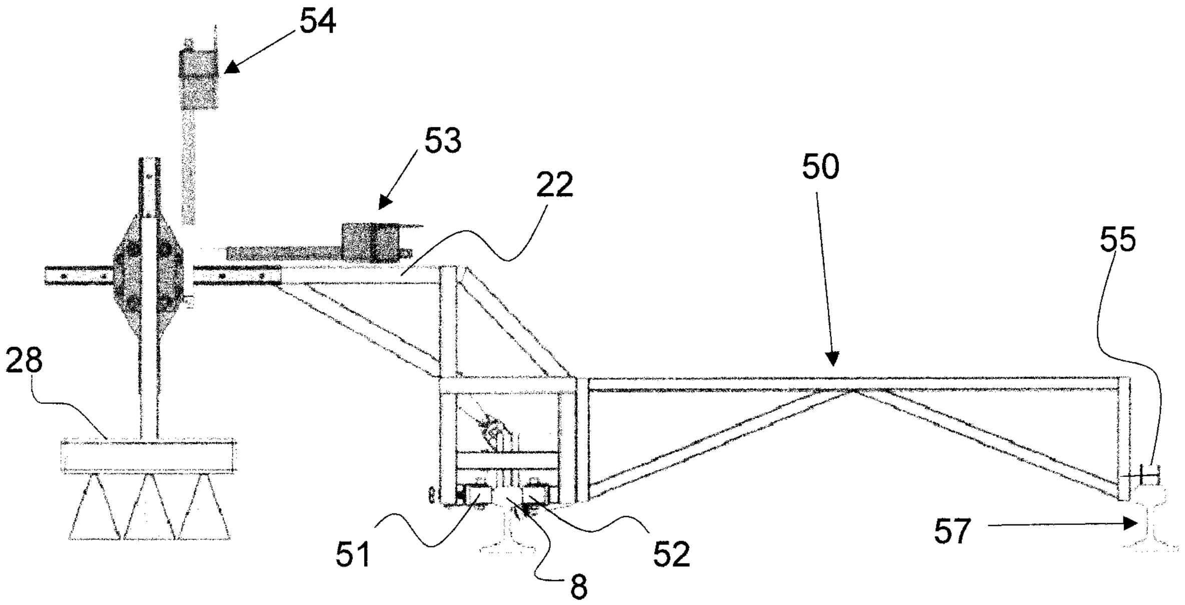
Figure 13:
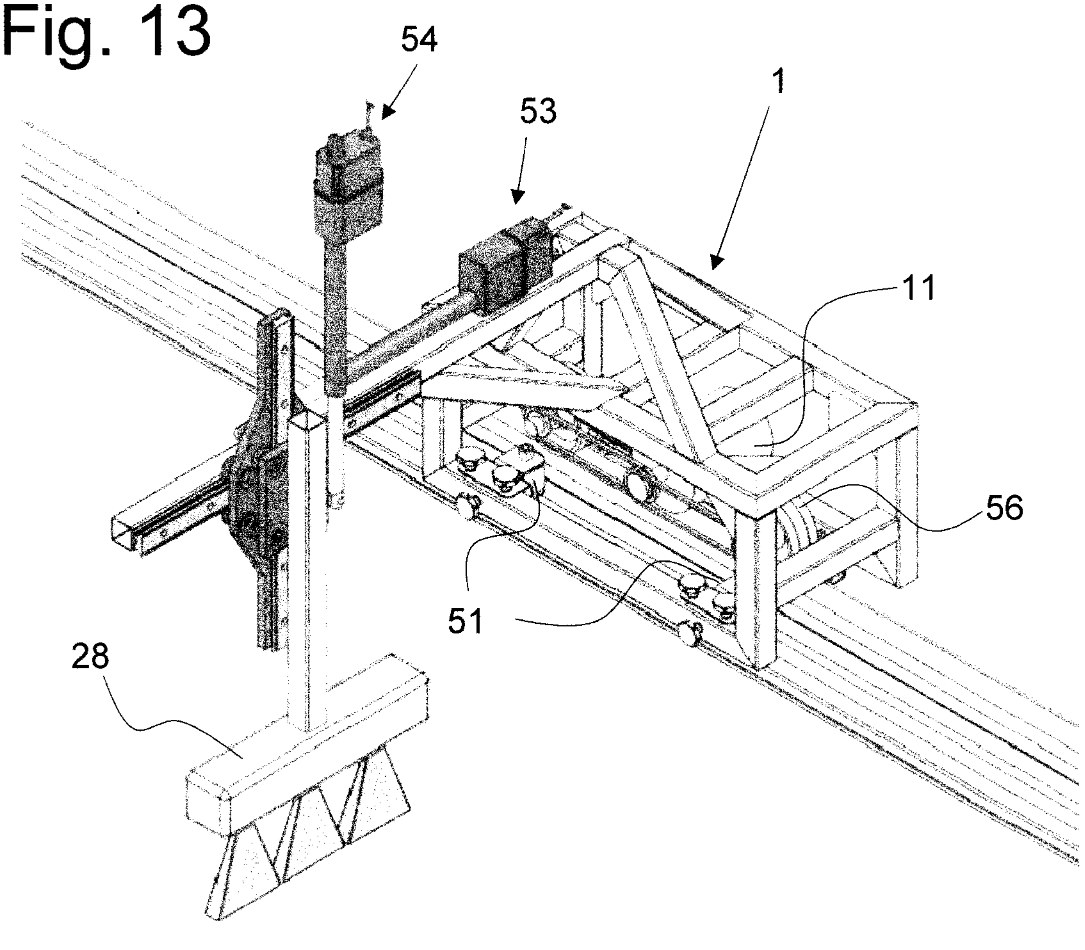
Figure 14:
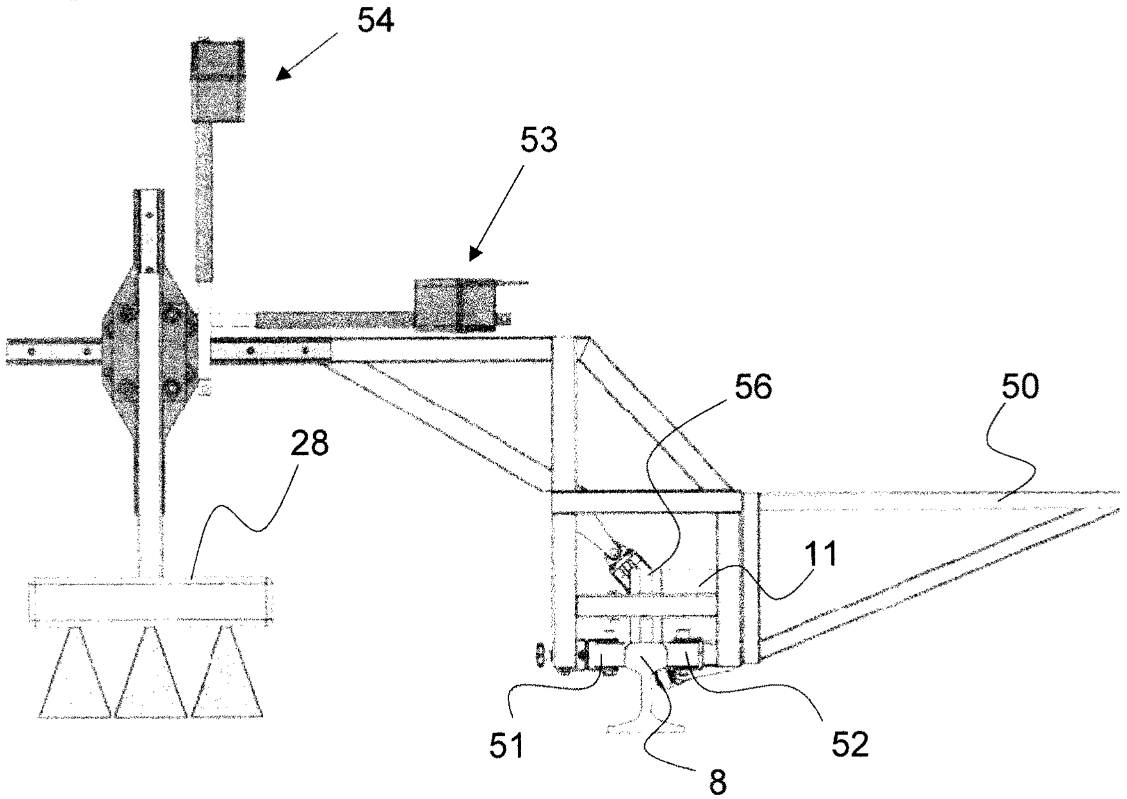
Figure 15:
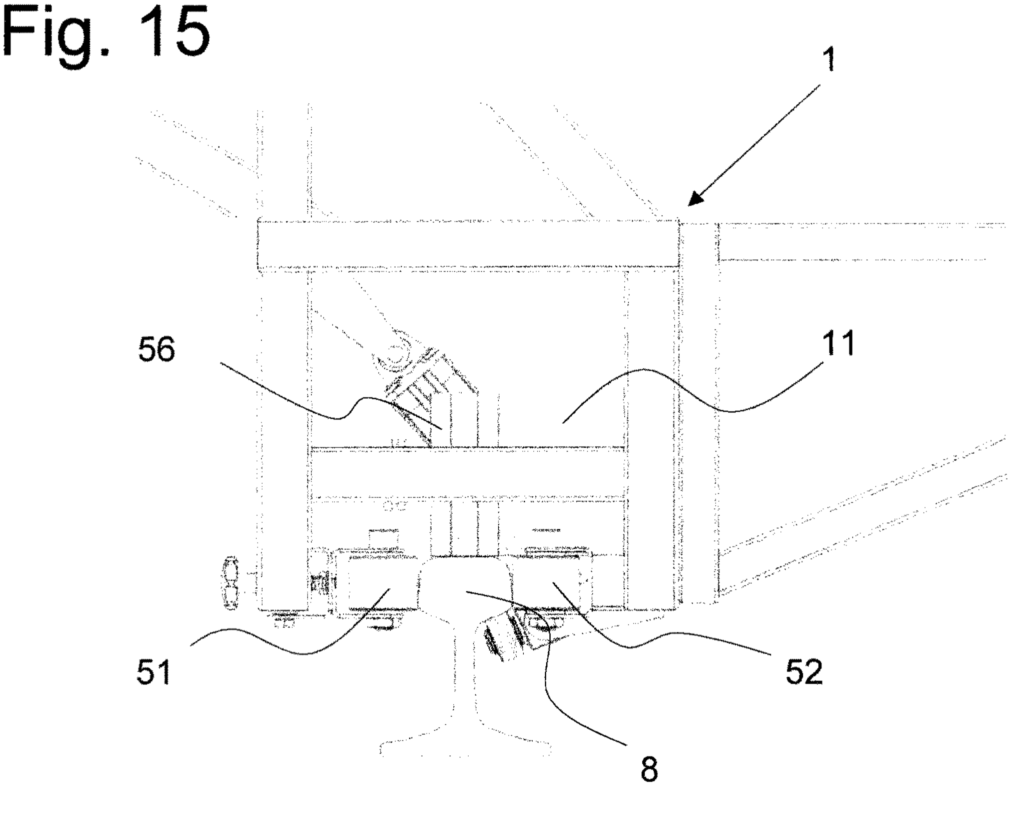
Figure 16:
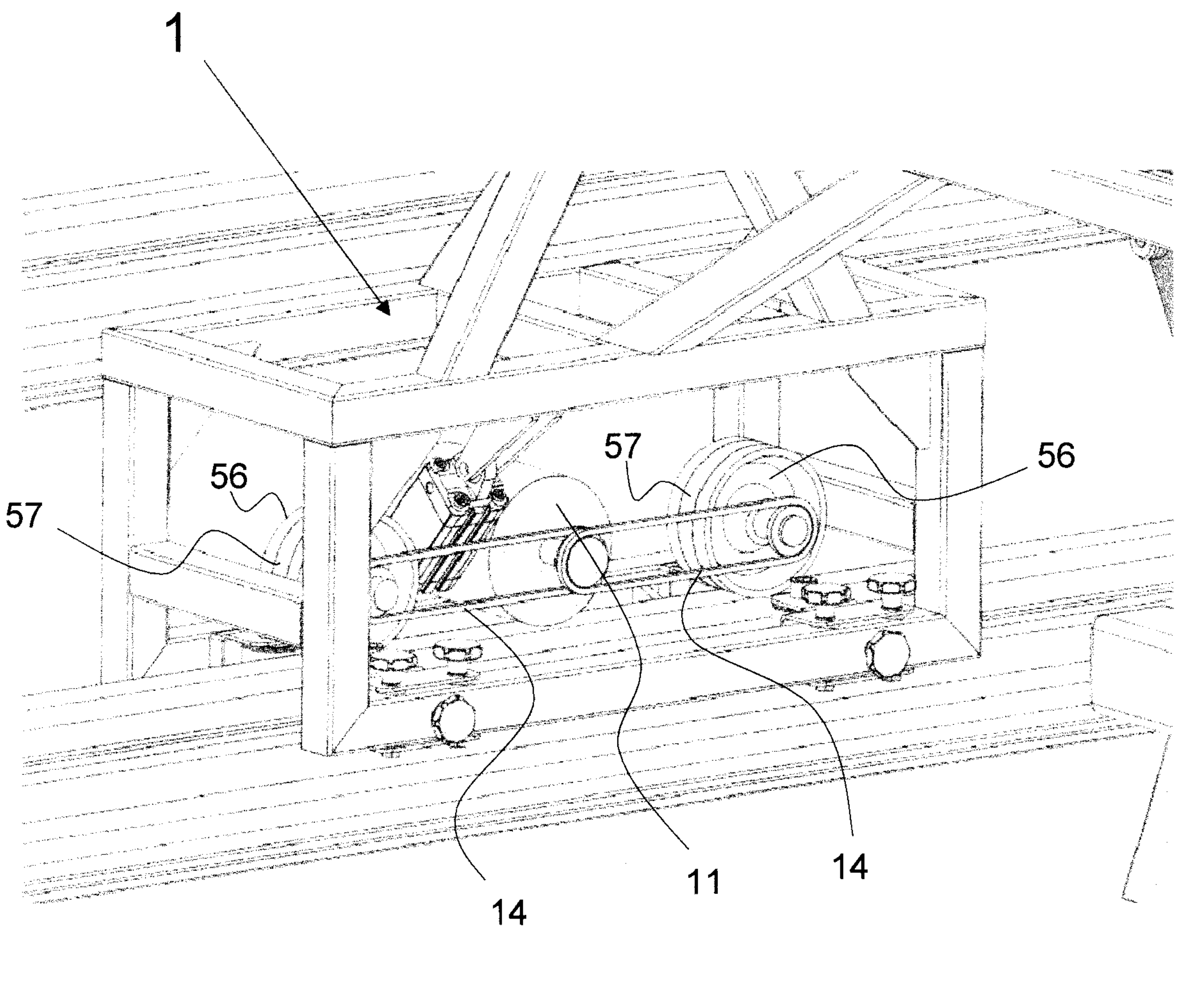

It shows:

FIG. 1: A cut-off gravel road, stabilized by prior bonding, on which a train is passing;

FIG. 2: A cut-off stabilized gravel road along a rail track in front of a tunnel portal;

FIG. 3: The trolley of the device according to the invention for discharging adhesive onto an area adjacent to a rail, seen in perspective from obliquely above and placed on a single rail;

FIG. 4: The trolley of the device according to the invention in a front view and placed on a single rail;

FIG. 5*a-d*: Four snapshots of the trolley when quickly placed on the rail;

FIG. 6: The trolley of the device with the boom and a spray bar mounted on it;

FIG. 7: A self-contained trolley of the equipment with electronic control unit, display and keypad integrated in the boom and an accumulator in the trolley housing;

FIG. 8: The complete equipment with associated exemplary supply vehicle, on which all elements for the electrical power supply and control for the pumping, for the possible mixing of adhesive components and for the controlled discharge of the adhesive or the components of a multi-component adhesive via hose connection to the delivery are present;

FIG. 9: The complete equipment with the associated exemplary supply vehicle, here movable on the rails, on which all elements for the mixing and controlled discharge of the adhesive or the components of a multi-component adhesive via hose connection to the delivery are present;

FIG. 10: A trolley in the form of a light rail wagon on one rail, with an outrigger for support on the other rail, shown in plan view, this trolley having no wheels rolling from below on the rail;

FIG. 11: The trolley or light rail wagon on one rail, with an outrigger for support on the other rail shown in perspective view in FIG. 10;

FIG. 12: Enlarged view of the trolley or light rail wagon on one rail, with an extension arm for support on the other rail as shown in FIG. 10;

FIG. 13: An enlarged view of a trolley for mounting on a single rail;

FIG. 14: The trolley according to FIGS. 10 to 12 shown in an enlarged elevation;

FIG. 15: The trolley according to FIGS. 10 to 12 shown alone, in an elevation and enlarged;

FIG. 16: The trolley according to FIGS. 10 to 12 shown alone, in a perspective view.

DETAILED DESCRIPTION OF THE DRAWING FIGURES AND PREFERRED EMBODIMENTS

In FIG. 1, a bonded ballast bed layer is shown, namely a ballast line cut off just outside along a rail track, which has previously been bonded by spraying on a two-component synthetic resin, in this case, so that it forms a quasi-monolithic block. In this state, the ballast to be excavated can be cut off with an excavator shovel, as shown here, and the bonded ballast shoulder nevertheless remains stable, so that vertical walls can be exposed without the drivable ballast losing much of its load-bearing strength and stability. Whenever, for example, cables or pipes have to be laid along such a rail track, major challenges arise for maintaining the stability of the rail track if it is to continue to be trafficked by trains, i.e. during the installation work for the cables and pipes. Without the possibility of line stabilization according to the present invention, the rail line would have to be closed to rail traffic, which would mean great restrictions and expensive downtime for rail operators.

FIG. 2 shows another ballast trench stabilized by bonding and then trenched along a rail line in front of a tunnel portal. As can be seen, a trench often has to be excavated over considerable distances, and here the problem arises in particular of how to stabilize a ballast line over long distances so reliably and safely that it can be certified for running on trains with normal loads. If the bonding of ballast is done by hand, no one can guarantee the homogeneity of the bond. In addition, bonding by hand is much too slow, labor-intensive, imprecise and correspondingly expensive. This is where the present invention comes in and makes it possible, in a completely different dimension, to bond ballast lines much faster and more rationally, in addition completely homogeneously, with exactly constant selectable width of the bond and with precisely definable penetration depth of the adhesive throughout the entire bond. Only this type of machine application of the adhesive can be so precise that the bonding and stabilization can be certified, so that a railroad operator can be sure that trains can run on this bonded track without hesitation and are also allowed to do so from an insurance point of view.

FIG. 3 shows a rail-mounted trolley 1 of the device according to the invention for placing on a single rail and for discharging adhesive onto an area adjacent to the rail. It is seen here in perspective as seen from obliquely above and placed on a single rail 16, thus in the rail-coupled or rail-bound state. The trolley 1 forms a frame 40 or box, in the interior of which wheels 2, 3, 4 are mounted. Initially, two wheels 2 are arranged on the frame 40 or box so that they are directed into the corner 7 between the rail head 8 and the rail web 9. For this purpose, the wheels 2 are mounted in bearings on a bend 5 on one side of the frame 40 in the example of the trolley 1 shown. On the opposite side of the frame 40, at least one guide wheel 3 projects at right angles to the vertical frame part 6 towards the rail web 9 and rolls on this far side or flank of the rail head 8. Preferably, two guide wheels 3 are arranged opposite the wheels 2 on this side of the rail head 8. From above in the frame 40, at least one drivable wheel 4 presses here on the rail head 8. For this purpose, the wheel 4 can be pivotably articulated on the frame 40, for example by being mounted, as shown here, between two pivot arms 10, which in turn can be pivoted on the frame 40 about a horizontal axis and press down here under spring load, thus pressing the wheel 4 onto the upper side of the rail head 8 when the trolley 1 is mounted. On top of the frame 40 of the trolley 1, an electric motor 11 is arranged here, the output shaft 12 of which drives a toothed rim 13 for a roller chain 14 or a toothed wheel for a toothed belt. The roller chain 14 or toothed belt then drives an associated sprocket or toothed wheel adjacent to the wheel 4, which is fixedly connected to the same. This succeeds in pushing the trolley 1 upwards, firstly, by the bearing force of the driving wheel 4, against the restraining force of the two guide wheels 2, while the at least one outer guide wheel 3 runs on the side of the rail head 8 and, together with the guide wheels 2, secures the trolley 1 against pivoting in any direction. In the example shown, this trolley 1 is designed with two such guide wheels 3 for rolling on the side of the rail head 8. Its only degree of freedom of movement is the displacement in the direction of the rail 16 on which its wheels 2-4 roll. With an electronic control of the electric motor 11 it is possible to ensure a selectable uniform movement of this trolley 1 on a rail 16.

FIG. 4 shows this trolley 1 of the device according to the invention in a front view and mounted on a single rail 16. It can be clearly seen here how the wheels 2, 3, 4 roll on different surfaces of the rail 16. The wheels 2 point into the corner 7 between the rail head 8 and rail web 9. They are attached to the bevel 5 of the frame 40, this bevel 5 being oriented inwardly and obliquely upwardly, and the wheels 2 are attached here at the bottom of the bevel 5. On the opposite side of the rail 16, at least one guide wheel 3 is guided here between two ears 17, 18 on an axle 19. This guide wheel 3 rolls here on one side of the rail head 8 on the same. For fine adjustment of this guide wheel 3, which acts as a support wheel, the two ears 17, 18 are adjustable here by means of the set screws 42, as indicated by the double arrows, so that the guide wheel 3 can be adapted to any varying track head widths. At least one further wheel acts from above, serving as drive wheel 4, which here rests spring-loaded on the upper side of the rail head 8 and rolls. For this purpose, in the example shown, it is held on the axle 20*b* between two swivel arms 10 attached to the frame 40, which are pivotably hinged to an attachment 21 on the horizontal axle 20. On one side of the wheel 4, this is equipped with a gear rim 15 or a gear wheel. A roller chain 14 runs over this sprocket 15 here, which runs over the top of another sprocket 13, which in turn is driven by the output shaft 12 of the electric motor 11. Instead of a roller chain 14, a toothed belt or a gear transmission can be used to transmit the power of the electric motor 11 to the drive wheel 4. From this illustration it can be seen that this trolley 1, i.e. its frame 40 or housing, can be very quickly placed on a rail 16 or lifted away from it again. From the position shown here, it can be lifted and removed from the rail 16 by lifting it on the left side and then unhooking the two wheels 2 by moving the bend 5 or the frame 40 downward and outward. Conversely, the trolley 1 with its guide wheels 2 can be quickly hooked onto the rail 16 and brought into position. First, the two wheels 2 are brought into position with the frame 40 in an inclined position relative to the rail 16, and then the frame 40 is swung down in a counterclockwise direction as shown until the drive wheel 4 rests on the top of the rail head 8. Then the wheel 3 rests on the other side of the rail head 8 and the trolley 1 is stably guided along the rail. All the wheels described can be adapted in position, type and shape to different rail profile types. Moreover, the number of wheels 2, 3, 4 may vary as long as they can perform the described function. Similarly, one or more caterpillars can be used in addition to or instead of the wheels 2, 3, 4, with which the trolley 1 can be driven along the rail line 9 in a securely held manner.

Figure 5A:
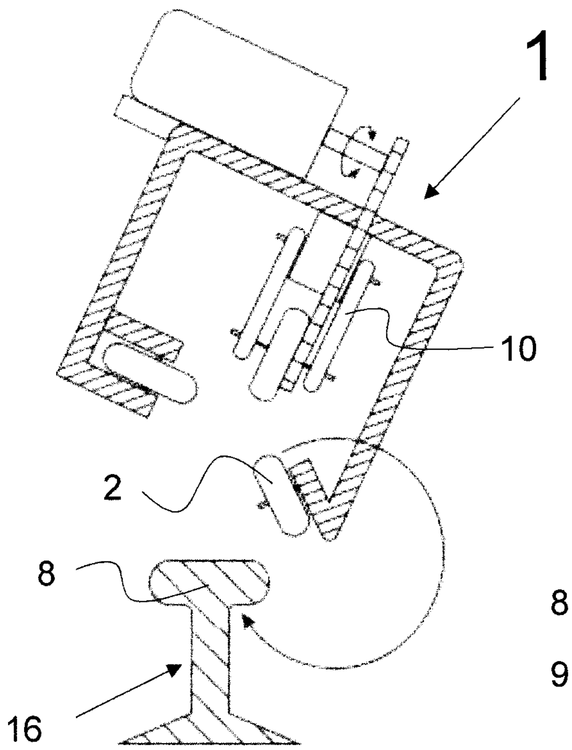
Figure 5B:
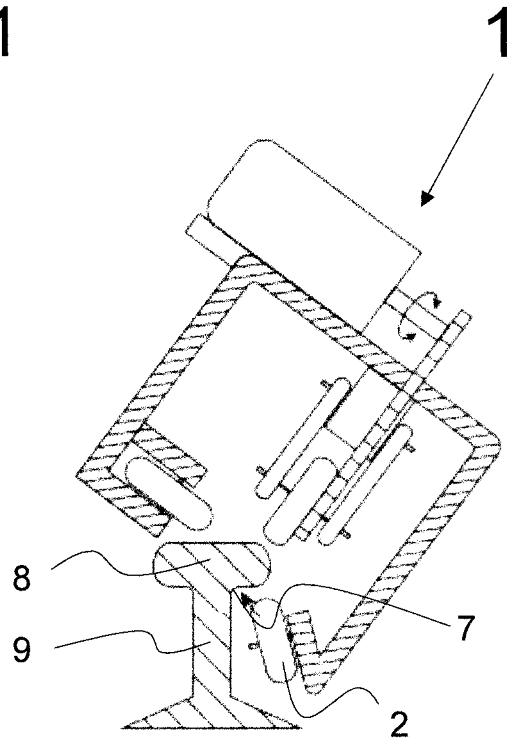
Figure 5C:
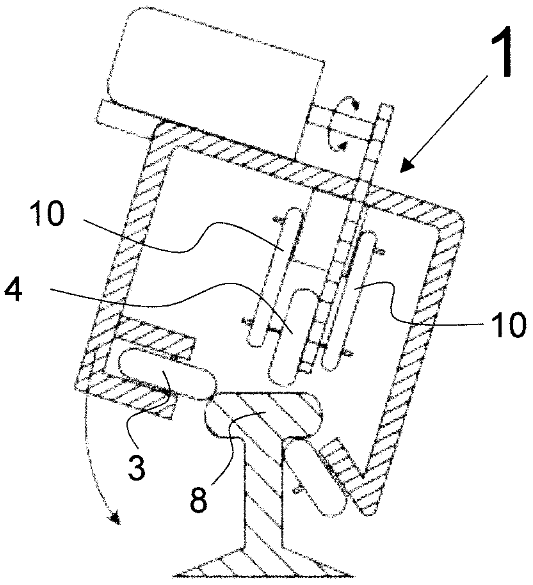
Figure 5D:
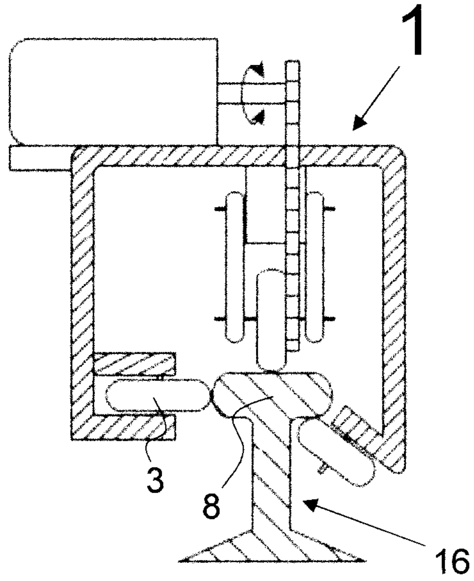

In FIGS. 5*a* to 5*d*, the sequence of placing the trolley 1 on the rail 16 is shown in four successive sequence images. In a position according to FIG. 5*a*, the trolley 1 is tilted about its longitudinal axis by about 30-40° and guided over the rail 16. Finally, the guide wheels 2 must be suspended from this position below the rail head 8, as indicated by the arrow showing their intended path. To do this, the trolley 1 is lowered in this tilted position, as shown in FIG. 5*b*, until the guide wheels 2 are below the rail head 8. Then, with their free side facing the inside of the frame 40 or box, the wheels 2 are brought into the corner 7 between the rail head 8 and the rail web 9, as indicated by the arrow. In the next step, the trolley 1 is pivoted about its longitudinal axis, as shown in FIG. 5*c* and indicated with an arrow, until the driving wheel 4 finds a support on the upper side of the rail head 8 and is then pressed onto the rail head 8 by virtue of the spring acting on its pivoting arms 10. In this condition, with the drive wheel 4 resting upright on the rail head 8, the guide wheel 3 or, depending on the design, the guide wheels 3, rests snugly against the side of the rail head 8 and the trolley 1 is held securely against rotation in any direction and snugly on the rail 16, as shown in FIG. 5*d*. The trolley 1 can now only roll back and forth along the rail 16. Removal of the trolley 1 from the rail 16 is carried out in exactly the opposite order. Coupling and securing of the trolley 1 can thus take place without the trolley 1 having to be specially adapted to the rail 16. Rather, the trolley 1 is secured against rotation on the rail 16 in any direction solely by being placed on the rail 16 as described and can be moved in a rail-guided manner. Similarly, the dismantling of the rail-bound and thus secured trolley 1 requires only its lifting away from the rail 16, in the reverse order to its mounting. This placing of the trolley 1 on the rail 16 or lifting of the trolley 1 from the rail 16 is a matter of a few seconds and usually requires no more than 5 seconds. It can be carried out by preferably two workers, which means that the personnel requirement for putting the device according to the invention into operation can be kept very low. Immediately after being set up, the trolley 1 is ready to travel on the rail 16, in forward or in reverse direction. These facts are now exploited for the application of adhesive, as will be described below.

In FIG. 6, the trolley 1 is placed on the rail 16 and locked on the same to a certain extent, so that it can only be moved along the rail 16 by rolling its guide wheels 2, 3 and the drive wheel 4 on the same. A boom 22 with a spray bar 28 and a swivel arm 23, which extends in the direction of the rail 16, are now further articulated to the trolley 1. A measuring wheel 24 with a rubber tread is mounted at the front end of this swivel arm 23. This measuring wheel 24 rests snugly on the upper side of the rail head 8, and with each movement of the trolley 1 on the rail 16, this measuring wheel 24 rolls precisely on the rail 16 so that it can serve as a measuring wheel. By means of this measuring wheel 24, each displacement of the trolley 1 on the rail 16 can accordingly be measured or recorded exactly or to the millimeter. Wheels 2, 3 and 4 can also serve as a measuring wheel, by attaching a tachometer. In this case, a separate measuring wheel 24 can be omitted.

FIG. 7 shows an alternative embodiment of the trolley 1 with a boom 22. This is a self-sufficient trolley 1 in that it has its own, preferably rechargeable accumulator 42. In the example shown, this is inserted on a battery holder 43 inside the frame 40 or housing of the trolley 1. Furthermore, the electronic control unit is accommodated within the extension arm 22, by means of which the drive of the trolley 1 as well as the pumping of the adhesive or the mixing of its components is controlled in the case of a mixed-component adhesive. The adhesive components can also be mixed first at the spray bar 28 by incorporating the mixing units in the same. For operation of the electronic control unit, a display 44 is built into the boom 22 in this case, with associated keypad 45 for entering the desired values for travel speed, travel distance, additionally the mixing ratio in the case of adhesives, and the start and stop of travel and pumping. In addition, a portable electronic device, such as a laptop, tablet or smartphone can be connected to the electronic control unit, preferably wirelessly. In this case, a display 44 and a keypad 45 are provided by the portable electronic device and inputs can be made through it, thus achieving remote control and remote monitoring. Finally, the trolley 1 and its outrigger 22 are preferably equipped with handles 46, 47, so that the trolley 1 can be quickly placed on a rail 16 by just two workers, for example, and can be removed from the rail 16 again just as quickly if required. For this purpose, the movements according to the illustrations in FIGS. 5*a* to 5*d* are to be carried out.

Mounted on the outer side of the trolley 1 is the boom 22, here with two legs, which projects upwards at an angle from the trolley 1 and carries at its end 25 in a holder 26 a tube 27, which is rotatable in this holder 26 relative to the end 25 of the boom 22. At the bottom, this tube 27 carries a single spray nozzle 29 or, as shown here, a spray bar 28 rotatable about the tube axis. Ideally, the spray bar 28 is displaceable horizontally and vertically under motor control and is mounted so as to be pivotable in all directions. The spray bar 28 is equipped with one or more spray nozzles 29-31. Optimally, a plurality of nozzles are arranged on the spray bar 28 for producing different spray patterns. In the example shown, the spray bar 28 contains three spray nozzles 29-31. Depending on its rotational position, the ballast bed 32 can be sprayed with adhesive through it over a more or less large selected width, the adhesive being supplied to the spray nozzles 29-31 via one or more hoses 35 (FIGS. 8, 9). This one or more hoses 35 come from the supply vehicle, which travels along substantially parallel to the rail track for operation of the trolley 1. It is necessary to bond this ballast bed 32 to the side of the rails 16 to make it stable for the purpose of vertically trenching and removing terrain 38 outside the bonded ballast bed 32 to excavate a trench or build a structure there, or lay another rail line, etc.

FIG. 8 shows the overall situation from a greater distance. In the course of constructing a building next to the track or a new parallel rail track next to the existing track, the subsoil 33 of the trench shown here is often used as a so-called construction slope after excavation. Trucks, dumpers, excavators or other machines are then driven on this construction slope to build the rail track. The supply vehicle 34 as shown here as an example in use can now be used for the bonding of the ballast bed 32 in its here left edge area. Such supply vehicles 34 with the entire equipment for carrying along adhesive or adhesive components, for exact mixing of the same and for pumping are already known. In the case of multi-component adhesives, mixing is preferably carried out by static mixers using gear pumps, and quantity metering by means of mass flow meters. This entire device as installed on such a vehicle is exhaustively described and shown in WO 2018/010860 A1. Single-component adhesives can also be used immediately with the same equipment without any modifications.

In FIG. 8, it can be seen how the supply vehicle 34 travels along the rail track 33 and supplies the trolley device 1 with the boom 22 and the spray nozzles 29-31 via one or more hoses 35. Likewise, cables 36 for the electrical supply and control of the electric motor 11 of the drive wheel 4 inside the frame 40 or housing of the trolley 1 lead from the supply vehicle 34 to the trolley 1. Further cables 37 lead from the optionally attached measuring wheel 24 or—if designed as measuring wheels—also from the wheels 2, 3, 4 to the electronic control unit, which is preferably carried on board the supply vehicle 34 or is provided by a portable electronic device. The hose connection 35 and the cables 36, 37 are guided here along a pivotable boom 39, which is removably hinged to the front of the supply vehicle 34. Towed behind the trolley 1, one can recognize the measuring wheel 24 or, depending on the embodiment, the wheel 2, 3, 4 acting as a measuring wheel, which provides reliable data on the travel speed of the trolley 1 to the electronic control unit on the supply vehicle 34 or on the portable electronic device. The measuring wheel 24 could also be pushed in front of the trolley 1 instead of being towed. According to this uniform speed, the previously calculated flow rates of the adhesive or adhesive components are calculated and then the pumps are controlled accordingly by means of feedback from the mass flow measuring devices. In this way, it is possible to apply a very precise quantity of adhesive per linear meter and thus to ensure a predetermined depth of penetration into the ballast bed 32—so reliable, in fact, that this process can even be certified with the aim of ensuring that a ballast bed shoulder 32 bonded in this way provides sufficient load-bearing capacity for trains of up to several hundred tons, as required. Once the ballast bed shoulder 32 has been bonded in this way, the material 38 can be excavated along the rail line and transported away. This area can therefore be exposed without risk, while the adjacent rail 16 can still be driven over. Finally, the bonding of the ballast bed shoulder should make it possible to cut off and remove the area 38 of the track that is hatched here, while maintaining the necessary stability of the track for trains to pass.

It is apparent that the trolley 1 together with its outrigger 22 can be placed on a single rail 16 within a few seconds and subsequently put into operation and, conversely, when a train is announced, this trolley 1 can just as quickly be taken off the rail 16 and removed so that a train can pass the work site unimpeded.

The pump technology and the spraying material as well as the power supply, etc., in other words, everything that is necessary to transport the adhesive or the multi-component adhesive cleanly mixed and controlled via hose lines 35 to the rail trolley 1, cannot only be transported on a vehicle 34 running parallel to the track. If no hurry is required and the gluing does not only have to be carried out in short time windows of usually a few minutes in this case, i.e. if a rail is specially closed for the gluing work to be carried out, a railroad car standing on the track and traveling with the trolley 1 can just as well also transport these devices for supplying the trolley 1. This rail car can then be pushed behind or pulled ahead of the rail trolley 1 by a locomotive, a trolley car or a track excavator at a more or less constant distance from the rail trolley 1. And in the same way it is understood that the co-transportation of these devices can also be carried out by a self-propelled two-way vehicle, i.e. by a vehicle which can be driven both on the road and on the rail. This vehicle then supplies the already mixed adhesive or the adhesive components to be mixed to the trolley device 1 via cables 36, 37 and hoses 35 in the same way as a road or off-road vehicle 34 traveling alongside the rail track.

Such a vehicle 48 movable on rails, here with rail wheels 49 which can be lowered hydraulically as required, is shown as an example in FIG. 9 and it can travel behind the trolley 1 or alternatively travel ahead of the trolley 1. In exactly the same way, a railroad wagon can take the place of such a vehicle 48, on which the entire equipment for tempering, pumping and mixing the components of the adhesive is mounted. This rail car then also carries the components for the power supply, for example, an internal combustion engine with generator and accumulators for operating the electric pumps and for heating the adhesive to the ideal temperature. Alternatively, traction current can be taken from the overhead line and made available to operate the equipment. Such a rail car can then travel on a parallel track to the track on which the trolley is mounted, which is supplied with conditioned adhesive from it via pump hoses 35, and is connected to the trolley via cables 36, 37 for control and power supply. It is gradually pushed or pulled along by a trolley or a light locomotive of the trolley, and thus need not move exactly uniformly with the trolley 1. If conditions permit, this rail car can also run on the same track on which the trolley 1 is placed. The rail-capable road vehicle in FIG. 9 is then simply replaced by such a railroad car.

The controlled mixing of the several adhesive components can optionally also first take place on the rail trolley 1. For this purpose, the mixer, preferably a static mixer, in which the spray material is mixed, is attached directly to the rail trolley 1.

FIGS. 10 to 16 show an alternative construction of the device, which can also do without wheels that roll from below on the rail head. This is then a lightweight rail wagon which can be placed on a track by hand. This offers the advantage that the wagon 1 is not suspended in the rail, but can be lifted vertically upwards away from it. To improve stability, it can have a further outrigger 50 opposite its outrigger 22 with the spraying device, extending towards the opposite rail on which the outrigger 50 rests with one or more support wheels 55, so that a light rail trolley is formed.

FIG. 10 shows such a trolley 1 in the form of a light rail carriage on a rail, with an outrigger 50 for support on the respective other rail in an elevation. This trolley 1 or rail carriage does not have wheels rolling from below on the rail, and can therefore be lifted vertically upwards off the rail at any time. A further advantage of this trolley or rail wagon is that it can also roll over switches, in that the wheels 51, 52 rolling laterally on the rail head can be briefly lifted away upwards for this purpose, for example pneumatically or electrically, and after passing the switch are lowered back to their initial state for rolling on both sides of the rail head. The boom 22 is equipped with a device 53 for lengthening or shortening the boom 22, as well as with a device 54 for adjusting the height position of the spray bar 28. These devices 53, 54 can be adjustable for this purpose by electric motor, pneumatically or hydraulically. At the outer end of the boom 50, a support wheel 55 can be seen, with which the boom 50 is supported in a rolling manner on this opposite rail.

FIG. 11 shows this rail wagon according to FIG. 10 on a rail, with an outrigger 50 for support on the opposite rail with, in the example shown, two support wheels 55 for the outer end of the outrigger 50.

FIG. 12 shows the rail wagon with its two outriggers 22 and 50 in an enlarged view. Here one can see the two wheels 51, 52 which roll on the two sides of the rail head 8 and thus stabilize the rail wagon against rotation about its vertical axis. Stabilization about the axis along the rail is provided by the outrigger 50 with its support on the opposite rail 57. In one variant, the spray bar 28 can also be installed movably on the rail wagon. For example, it can be mounted on an extension arm which extends over the entire width of the rail wagon, and the spray bar 28 can be mounted on this extension arm so that it can be displaced by a motor, for example by means of an electric drive. In this case, when the rail wagon is stationary or moving, the spray bar 28 can move back and forth uniformly over the entire width of the ballast bed of a rail line and ensure uniform penetration of the adhesive into the ballast bed. This boom can also be designed to swivel about a vertical axis so that it no longer extends across the rail line, for example, but longitudinally, along the rail. When the rail wagon is stationary, the spray bar 28 can then move back and forth uniformly along the boom and thus bond a longitudinal section of the lateral ballast bed, i.e. a ballast bed shoulder, with a constant penetration depth of the adhesive.

FIG. 13 shows the part of the rail trolley with the drive, that is, in a sense, its trolley 1, shown separately, in enlarged and perspective view. Inside it are housed the drive wheels 56 with which the trolley 1 rests on the rail, so that its entire weight ensures good adhesion. Between the two drive wheels 56, which can also act as measuring wheels, one can see the electric motor 11 for their drive.

FIG. 14 shows this trolley according to FIGS. 11 and 12 in an elevation view. The electric motor 11 can be seen, and to the left of it the drive wheel 56, which is shown here at the front, as well as the two guide wheels 51, 52, which roll on the two sides of the rail head 8. FIG. 15 shows all this in enlarged form, and FIG. 16 shows a perspective view. Here one can see the drive belts or roller chains 14 by means of which the electric motor 11 drives the drive wheels 56. The drive wheels are equipped with a rubber tread 57 to ensure good adhesion.

Overall, the device presented herein and the process performed with it allows the following:

The controllable, traceable discharge speed, documented in real time and adjustable in relation to all parameters, The controllable, traceable, documented in real time and adjustable discharge quantity of adhesive per surface in relation to all parameters;

The controllable, traceable, documented in real time and adjustable application width depending on all parameters;

In addition, the mixing accuracy is traceable, can be documented in real time, and damage to the environment can be ruled out at any time.

LIST OF NUMERALS

1 Trolley
2 Guide wheels for rail head/rail web corner 7
3 Guide wheels on rail web 9
4 Drive wheel of the trolley 1
5 Bevel for the wheels 2
6 vertical frame part
7 Corner rail head 8/rail web 9
8 Rail head
9 Rail web
10 Swivel arms for drive wheel 4
11 Electric motor
12 Output axis of the electric motor 11
13 Gear rim on output shaft 12
14 Roller chain
15 Gear rim on drive gear 4
16 Rail
17 Ear for axis 19 of guide wheel 3
18 Ear for axis 19 of guide wheel 3
19 Axis for guide wheel 3
20*a* Axis through swivel arm 10
20*b* Axis through swivel arm 10 and drive wheel 4
21 Attachment for swivel arms 10
22 Boom
23 Swivel arm for measuring wheel 24
24 Measuring wheel
25 End of the boom 22
26 Tube support 27
27 Vertical pipe for spray nozzle/swivel bar
28 Spray bar
29 Spray nozzle
30 Spray nozzle
31 Spray nozzle
32 Ballast bed
33 Subsoil/building slope
34 Supply vehicle
35 Hoses for adhesive or adhesive components
36 Cable for electric motor 11
37 Cable from measuring wheel 24 to control unit
38 Area to be cut and removed
39 Boom on supply vehicle 34
40 Frame, box, housing of the trolley 1
41 Set screws for adjusting the guide wheel 3
42 Accumulator
43 Accumulator holder in the trolley 1
44 Display on boom 22
45 Keypad to electronic unit and display 44
46 Handles for carrying the trolley 1
47 Handles on the boom 22 for its lifting
48 On rails 16 mobile vehicle
49 Hydraulically lowerable to the rails 16 rail wheels
50 Outrigger on the trolley towards the opposite rail
51 Wheel rolling sideways on the outside of the rail head
52 Wheel rolling laterally on the inside of the rail head
53 Adjustment unit for length of boom 22
54 Adjustment unit for the height position of the spray bar 28
55 Support wheel on boom 50 for on the opposite rail
56 Drive wheel
57 Rubber running surface of drive wheels 56

The invention claimed is:

1. An apparatus for discharging single- or multi-component adhesive onto a ballast bed of a rail track of a rail line, said apparatus comprising:

a container for a single- or multi-component adhesive from which said single- or multi-component adhesive is discharged;

a supply vehicle for supporting said container; and, a rail wagon or a trolley for moving along a single rail, or on both rails of the railway that is able to be manually placed, or assembled, on the single rail or both said rails of the railway that is able to be supplied with the single- or multi-component adhesive from said supply vehicle via a hose line having at least one spray nozzle and being mounted on said rail wagon or said trolley for providing a defined penetration depth of the single- or multi-component adhesive into a ballast bed able to be maintained via a uniform travel speed of said rail wagon or said trolley or via uniform movement of said at least one spray nozzle mounted on said rail wagon or said trolley by defined flow rates of the single- or multi-component adhesive by said supply vehicle, as dependent upon the ballast bed and a desired spray pattern, wherein said trolley includes a boom projecting laterally therefrom with respect to a direction of travel of said trolley, and a tube mounted thereon and a spray bar extending transversely to said tube with said spray bar having said at least one spray nozzle with said spray bar being rotatable on said tube and is vertically adjustable in height and mounted to be horizontally displaceable in width.

2. The apparatus for discharging single- or multi-component adhesive onto a ballast bed of a rail track of a rail line according to claim 1, wherein said trolley is rail-guided on the railway and independently movable of said supply vehicle, said trolley having its own drive movable at a uniform and selectable speed, said trolley further comprising a boom on which said at least one spray nozzle is mounted to be horizontally and vertically displaceable and pivotable in all directions, so that the defined penetration depth of the single- or multi-component adhesive is maintained by a uniform travel speed of said trolley and defined flow rates of the single- and multi-component adhesive depending on the ballast bed and the desired spray pattern.

3. The apparatus for discharging single- or multi-component adhesive onto a ballast bed of a rail track of a rail line according to claim 2, further comprising an electronic control unit in said boom with a display having an associated keypad for inputs to said electronic control unit.

4. The apparatus for discharging single- or multi-component adhesive onto a ballast bed of a rail track of a rail line according to claim 1, further comprising a boom having a spray bar mounted on said rail wagon, said boom being displaceable horizontally and vertically via a motor drive and is mounted to be pivotable in all directions and having a plurality of said spray nozzles for producing different spray patterns.

5. The apparatus for discharging single- or multi-component adhesive onto a ballast bed of a rail track of a rail line according to claim 4, further comprising an electronic control unit in said boom with a display having an associated keypad for inputs to said electronic control unit.

6. The apparatus for discharging single- or multi-component adhesive onto a ballast bed of a rail track of a rail line according to claim 1, wherein said rail wagon or said trolley is drivable via an electric motor mounted thereon and movable along the railway via remote control operable by a portable electronic device, and further comprising a spray bar mounted on said rail wagon or said trolley and adjustable vertically and horizontally in all directions via the remote control.

7. The apparatus for discharging single- or multi-component adhesive onto a ballast bed of a rail track of a rail line according to claim 1, wherein said trolley or said rail wagon is configured to be mounted on the railway and securable against rotation in all directions when on the railway.

8. The apparatus for discharging single- or multi-component adhesive onto a ballast bed of a rail track of a rail line according to claim 1, wherein said trolley includes handles on said boom for facilitating lifting.

9. The apparatus for discharging single- or multi-component adhesive onto a ballast bed of a rail track of a rail line according to claim 1, wherein said trolley or said rail wagon includes an accumulator for autonomously driving said trolley or said rail wagon.

10. An apparatus for discharging single- or multi-component adhesive onto a ballast bed of a rail track of a rail line, said apparatus comprising:

a container for a single- or multi-component adhesive from which said single- or multi-component adhesive is discharged;

a supply vehicle for supporting said container; and, a rail wagon or a trolley for moving along a single rail, or on both rails of the railway that is able to be manually placed, or assembled, on the single rail or both said rails of the railway that is able to be supplied with the single- or multi-component adhesive from said supply vehicle via a hose line having at least one spray nozzle and being mounted on said rail wagon or said trolley for providing a defined penetration depth of the single- or multi-component adhesive into a ballast bed able to be maintained via a uniform travel speed of said rail wagon or said trolley or via uniform movement of said at least one spray nozzle mounted on said rail wagon or said trolley by defined flow rates of the single- or multi-component adhesive by said supply vehicle, as dependent upon the ballast bed and a desired spray pattern, wherein said trolley includes an extension arm that extends to an opposing rail of the railway and is able to be supported on the opposing rail via at least one support wheel for allowing said trolley to bear weight of said trolley and to roll on top of a rail head.

11. The apparatus for discharging single- or multi-component adhesive onto a ballast bed of a rail track of a rail line according to claim 10, wherein said at least one support wheel includes at least one drive wheel which bears the weight of said trolley and rolls on top of the rail head.

12. The apparatus for discharging single- or multi-component adhesive onto a ballast bed of a rail track of a rail line according to claim 10, wherein said trolley includes a frame on which guide wheels are directed obliquely to the railway for rolling between the rail head and a rail web of the railway, and on an opposing side of said frame there is at least one additional guide mounted for allowing said trolley to roll laterally of the rail head and, further, at least one drive wheel is mounted on said frame of said trolley for driving said trolley when said trolley is mounted on the railway.

13. An apparatus for discharging single- or multi-component adhesive onto a ballast bed of a rail track of a rail line, said apparatus comprising:

a container for a single- or multi-component adhesive from which said single- or multi-component adhesive is discharged;

a supply vehicle for supporting said container; and, a rail wagon or a trolley for moving along a single rail, or on both rails of the railway that is able to be manually placed, or assembled, on the single rail or both said rails of the railway that is able to be supplied with the single- or multi-component adhesive from said supply vehicle via a hose line having at least one spray nozzle and being mounted on said rail wagon or said trolley for providing a defined penetration depth of the single- or multi-component adhesive into a ballast bed able to be maintained via a uniform travel speed of said rail wagon or said trolley or via uniform movement of said at least one spray nozzle mounted on said rail wagon or said trolley by defined flow rates of the single- or multi-component adhesive by said supply vehicle, as dependent upon the ballast bed and a desired spray pattern, wherein said trolley or said rail wagon includes an accumulator for autonomously driving said trolley or said rail wagon, and said trolley or said rail wagon further includes a measuring wheel mounted on a swivel arm that is articulated about a horizontal axis on said trolley or said rail wagon, and is intended to roll on the railway when said trolley or said rail wagon is placed thereon.

14. The apparatus for discharging single- or multi-component adhesive onto a ballast bed of a rail track of a rail line according to claim 13, wherein said trolley or said rail wagon includes a control unit for controlling travel speed along the railway with the travel speed being controllable via feedback from said measuring wheel.

15. A method for discharging a single- or multi-component adhesive onto a ballast bed of a rail track of a rail line utilizing an apparatus, comprising:

a container for a single or multi-component adhesive from which said single- or multi-component adhesive is discharged;

a supply vehicle for supporting said container; and, a rail wagon or a trolley for moving along a railway that is able to be supplied with the single- or multi-component adhesive from said supply vehicle via a hose line having at least one spray nozzle and being mounted on said rail wagon or said trolley for providing a defined penetration depth of the single- or multi-component adhesive into a ballast bed able to be maintained via a uniform travel speed of said rail wagon or said trolley or via uniform movement of said at least one spray nozzle mounted on said rail wagon or said trolley by defined flow rates of the single- or multi-component adhesive by said supply vehicle, as dependent upon the ballast bed and a desired spray pattern, wherein said trolley includes a boom projecting laterally therefrom with respect to a direction of travel of said trolley, and a tube mounted thereon and a spray bar extending transversely to said tube with said spray bar having said at least one spray nozzle with said spray bar being rotatable on said tube and is vertically adjustable in height and mounted to be horizontally displaceable in width, said method comprising the steps of:

arranging said supply vehicle adjacent the railway;

placing said trolley manually on a single rail of the railway or on two rail of the railway or placing said rail wagon manually on the railway or assembling said railway wagon on the railway;

applying adhesive to the ballast bed, wherein said supply vehicle travels alongside the railway within reach of the hose line, so that said at least one spray nozzle is supplied with said single- or multi-component adhesive from said supply vehicle the hose line with the defined penetration depth of the single- or multi-component adhesive being maintained via the uniform travel speed of said trolley or said rail wagon, or by uniform movement of said at least one spray nozzle when said trolley or said rail wagon is either moving or stationary, the defined flow rates depending on the condition of the ballast bed and the desired spray pattern; and, removing the said trolley manually from the single rail or from railway or removing said rail wagon manually from the railway or disassembling said railway wagon manually on the railway and remove it manually whenever a train approaches for letting said train pass by, and then again placing said trolley manually on a single rail of the railway or on the two rails of the railway or placing said rail wagon manually on the railway or assembling said railway wagon manually on the railway for continuing the applying of adhesive to the ballast bed.

16. The method for discharging a single- or multi-component adhesive onto a ballast bed of a rail track of a rail line according to claim 15, wherein said trolley or said rail wagon is configured to be mounted on the railway and securable against rotation in all directions when on the railway.

* * * * *